(12) United States Patent  
Thiruvenkatanathan et al.

(10) Patent No.: US 9,261,525 B2  
(45) Date of Patent: *Feb. 16, 2016

(54) MEMS INERTIAL SENSOR AND METHOD OF INERTIAL SENSING

(75) Inventors: Pradyumna Thiruvenkatanathan, Cambridge (GB); Ashwin Seshia, Cambridge (GB); Jize Yan, Cambridge (GB)

(73) Assignee: Cambridge Enterprise Limited, Cambridge (GB)

( * ) Notice: Subject to any disclaimer, the term of this patent is extended or adjusted under 35 U.S.C. 154(b) by 461 days.

This patent is subject to a terminal disclaimer.

(21) Appl. No.: 13/700,718

(22) PCT Filed: May 26, 2011

(86) PCT No.: PCT/GB2011/000805  
§ 371 (c)(1),  
(2), (4) Date: Jun. 24, 2013

(87) PCT Pub. No.: WO2011/148137  
PCT Pub. Date: Dec. 1, 2011

(65) Prior Publication Data  
US 2013/0298675 A1  Nov. 14, 2013

(30) Foreign Application Priority Data  
May 28, 2010 (GB) .................................. 1009062.9

(51) Int. Cl.  
*G01P 15/097* (2006.01)  
*G01C 19/56* (2012.01)  
(Continued)

(52) U.S. Cl.  
CPC .............. *G01P 9/04* (2013.01); *G01C 19/5726* (2013.01); *G01C 19/5755* (2013.01); *G01P 15/097* (2013.01); *G01P 15/18* (2013.01); *G01P 2015/0814* (2013.01)

(58) Field of Classification Search  
CPC .............. G01P 15/097; G01P 15/0888; G01P 15/0802; G01P 15/08; G01C 19/5719; G01C 19/5712; G01C 19/574; G01C 19/5769; G01C 19/5726  
USPC ............... 73/514.29, 514.16, 514.01, 514.38, 73/514.36, 504.12, 504.04, 504.14  
See application file for complete search history.

(56) References Cited

U.S. PATENT DOCUMENTS 4,479,385 A  10/1984  Koehler  
5,005,413 A * 4/1991  Novack et al. ............. 73/514.29  
(Continued)

FOREIGN PATENT DOCUMENTS

CN  101303365 A  11/2008

OTHER PUBLICATIONS

Pierre, C. "Mode Localization and Eigenvalue Loci Veering Phenomena in Disordered Structures", Journal of Sound and Vibration, 1988, 126(3), 485-502.

(Continued)

*Primary Examiner* — Helen Kwok  
(74) *Attorney, Agent, or Firm* — John B. Hardaway, III; Nexsen Pruet, LLC

(57) ABSTRACT

The invention comprises an inertial sensor comprising a frame, a proof mass; a first resonant element having a proximal end and a distal end, the first resonant element being fixed to the frame at its proximal end and coupled to the proof mass at its distal end, a second resonant element having a proximal end and a distal end, the second resonant element being fixed to the frame at its proximal end, adjacent to the first resonant element such that there is no coupling between the second resonant element and the proof mass, a means for coupling the first resonant element to the second resonant element; a drive means coupled to the first and second resonant elements for vibrating the first and second resonant elements; and a sensor assembly for detecting the amplitude of vibration of the resonant elements.

20 Claims, 11 Drawing Sheets

(51) Int. Cl.
*G01C 19/5726* (2012.01)
*G01C 19/5755* (2012.01)
*G01P 15/18* (2013.01)
*G01P 15/08* (2006.01)

(56) References Cited

U.S. PATENT DOCUMENTS

| | | | | |
|---|---|---|---|---|
| 5,379,639 | A * | 1/1995 | Hulsing et al. | 73/514.29 |
| 5,501,103 | A * | 3/1996 | Woodruff et al. | 73/514.29 |
| 5,594,170 | A * | 1/1997 | Peters | 73/514.29 |
| 5,948,981 | A * | 9/1999 | Woodruff | 73/514.29 |
| 5,969,249 | A | 10/1999 | Roessig et al. | |
| 6,435,029 | B1 | 8/2002 | Hulsing, II et al. | |
| 7,467,553 | B2 * | 12/2008 | Meyer | 73/514.29 |
| 7,640,803 | B1 | 1/2010 | Gutierrez et al. | |
| 8,375,788 | B2 * | 2/2013 | Robert | 73/504.12 |
| 8,497,672 | B2 * | 7/2013 | Kawakubo et al. | 324/162 |
| 8,783,107 | B2 * | 7/2014 | Robert et al. | 73/514.29 |
| 2003/0010122 | A1 | 1/2003 | Collins | |
| 2005/0081630 | A1 | 4/2005 | Leverrier et al. | |
| 2012/0132003 | A1 * | 5/2012 | Comi et al. | 73/514.29 |
| 2014/0305208 | A1 * | 10/2014 | Thiruvenkatanathan et al. | 73/504.12 |

OTHER PUBLICATIONS

Pierre, C. et al, "Localization of Vibrations by Structural Irregularity", Journal of Sound and Vibration, 1987, 114(3), 549-564.

Thiruvenkatanathan P et al, "Enhancing Parametric Sensitivity in Electrically coupled MEMS Resonators", Journal of Microelectromechanical Systems, 2009, vol. 18, No. 5.

Thiruvenkatanathan P et al, "Ultrasensitive mode-localized mass sensor with electrically tunable parametric sensitivity", Applied Physics Letters, 2010, vol. 96, No.

Thiruvenkatanathan P et al, "Ultrasensitive mode-localized micromechanical electrometer", Frequency Control Symposium (FCS), 2010, p. 91-96.

ISR, Written Opinion, WIPO, PCT/GB2011/000805, Aug. 1, 2011.

Search Report, UKIPO, GB1009062.9, Sep. 21, 2010.

* cited by examiner

MEMS INERTIAL SENSOR AND METHOD OF INERTIAL SENSING

FIELD OF THE INVENTION

The present invention relates to inertial sensors and methods of inertial sensing using microscopic mechanical inertial sensors.

BACKGROUND TO THE INVENTION

Accelerometers and gyroscopes are in wide use today for a variety of motion sensing applications ranging from inertial navigation to vibration monitoring. Accelerometers measure changes in acceleration (linear or rotational) while gyroscopes provide information about angular motion (rotation). These devices use the inertial properties of light or matter for their operation and have hence been broadly classified as 'inertial sensors'.

Inertial sensors have traditionally served navigation markets. Macroscale gyroscopes and accelerometers are used to provide information about the position, orientation and velocity for aircraft and naval vessels. They have also been incorporated into control systems that are used for robotic applications, such as missile guidance, unmanned aircraft, and industrial machine control. Commercial inertial navigation grade sensors are available from Honeywell Corporation, Northrop Gumman and Navsys Corporation, amongst others.

While these macroscopic accelerometers and gyroscopes still remain the premier instruments for inertial grade navigation systems, microscopic mechanical inertial sensors fabricated using MEMS technology have been perceived as a breakthrough in inertial navigation and motion sensing, due to the substantial reduction in cost, size and power that may be achieved in such micromechanical sensors relative to their macroscopic counterparts. These attributes have enabled the use of such inertial sensors in a variety of applications that have traditionally not been possible due to either their prohibitive cost or size restrictions, for example, in mobile phones, MP3 players, PDAs, notebooks, surgical instruments etc. Commercial MEMS inertial sensors are now available from Analog Devices Inc., Motorola, ST Microelectronics and Silicon sensing systems amongst several others.

Micro-machined MEMS resonant accelerometers and gyroscopes are well known in prior art. See for example, U.S. Pat. No. 7,640,803, CN101303365 and U.S. Pat. No. 5,969,249. Most of the disclosed MEMS resonant inertial sensors respond to acceleration or angular rotation by producing a frequency shifted output signal arising from an oscillating unit incorporated as a part of the sensor.

However, the resolutions achievable in these devices are still lower than that required for inertial grade navigation systems. It is an object of the present invention to overcome this disadvantage by enhancing the output sensitivity and in effect, the resolution of such sensors.

SUMMARY OF THE INVENTION

The present invention is defined in the appended independent claims, to which reference should now be made.

In a first aspect, the invention comprises an inertial sensor comprising:
  a frame;
  a proof mass;
  a first resonant element having a proximal end and a distal end, the first resonant element being fixed to the frame at its proximal end and coupled to the proof mass at its distal end;
  a second resonant element having a proximal end and a distal end, the second resonant element being fixed to the frame at its proximal end, adjacent to the first resonant element such that there is no coupling between the second resonant element and the proof mass;
  a means for coupling the first resonant element to the second resonant element;
  a drive means coupled to the first and second resonant elements for vibrating the first and second resonant elements; and
  a sensor assembly for detecting the amplitude of vibration of the resonant elements.

Preferably, the first and second resonant elements are of substantially the same dimensions and material properties. Preferably, the first and second resonant elements are double ended tuning fork (DETF) resonators. However, any suitable resonant elements may be used.

A sensor in accordance with the present invention comprises two key elements—a 'proof mass' (usually a pendulously suspended mass that moves in response to an inertial force imposed on the sensor e.g., in response to an acceleration) and an array of (i.e. two or more) weakly coupled, preferably substantially identical, resonators with one of the resonant units alone, connected to the proof mass.

An inertial force input on the sensor displaces the proof mass thereby modulating the strain on that resonating element connected to the proof mass, without altering that on the other coupled resonating units. The variations in the eigenstates (which refer to the relative amplitudes at the resonant frequencies measured from each of the resonators) due to such induced strain modulation, yields a measure of the inertial force on the sensor. Measuring such eigenstate variations induced by mode localization offers two key advantages over conventional resonant frequency shift based measurements:
  (1) insensitivity to unwanted environmental variations; and
  (2) orders of magnitude enhancement in the output sensitivity and consequently, the resolution of such sensors.

Preferably, the means for coupling the first resonant element to the second resonant element is an electrostatic coupling means. This allows the coupling strength between the resonant elements to be very weak and to be tuned. The weaker the coupling, the more pronounced the mode localisation. It also allows any minor mechanical differences between the resonant elements to be compensated for. Compensation for minor mechanical differences between the resonant elements may also be provided by separate polarisation electrodes, adjacent to the resonant elements, allowing for voltage tuning of the sensor to symmetry without altering the strength of the electrostatic coupling.

The electrostatic coupling means may be the application of different DC voltages to each of the resonant elements. In this case, the coupling may take the form of a pair of plates, one plate in the pair of plates coupled to or forming part of the first resonant element and the other plate in the pair of plates coupled to or forming part of the second resonant element, and a voltage source connected to the pair of plates for applying a voltage difference between the plates.

Alternatively, the means for coupling may be a mechanical linkage between the first resonant element and the second resonant element, coupled to the first resonant element at a position between the proximal and distal ends of the first resonant element and coupled to the second resonant element at a position between the proximal and distal ends of second resonating element. Preferably, the mechanical linkage is positioned closer to the proximal ends of the first and second resonant elements than to their distal ends. Preferably, the mechanical linkage is integrally formed with the first and second resonant elements.

Whichever means of coupling is used, the coupling preferably has an effective stiffness of less than half of the stiffness of both the first and second resonant elements. The weaker the coupling between resonant elements is, the greater the sensitivity of the sensor. However, the weaker the coupling is between the resonant elements the closer the resonant modes are in frequency. The coupling must therefore be non-zero and sufficient for each resonant mode to be resolvable from each other. In other words the coupling must be strong enough that there is no modal overlap in the coupled response of the system.

The drive means preferably comprises a first drive electrode coupled to the first resonant element for exciting the first resonant element. The drive means may further comprise a second drive electrode coupled to the second resonant element for exciting the second resonant element. Alternatively, if a mechanical coupling means is used, a single drive electrode may be used to excite both of the resonant elements. Drive electrodes may also be provided adjacent to the first and second resonant electrodes, but not directly connected thereto.

Preferably, the sensor assembly comprises capacitive sensors positioned adjacent the first and second resonant elements to detect the amplitude of vibration of the sensors. The capacitive sensors may take the form of electrodes positioned adjacent to the first and second resonant elements. A DC bias voltage can be applied to the sense electrodes. The DC bias forms part of the drive means.

Preferably, the inertial sensor further comprises processing electronics for determining a ratio of the amplitude of oscillation of the first resonant element and the amplitude of oscillation of the second resonant element. The amplitude ratio can be used to provide a measure of the strain modulation on the first resonant element, and so a measure of the inertial force exerted by the proof mass on the first resonant element.

If an electrostatic coupling means is used, and the first and second drive electrodes are coupled to the resonant elements, the drive electrodes may form part of the electrostatic coupling. The drive electrodes may be used to apply a different DC voltage to each resonant element.

Preferably, the inertial sensor further comprises at least one lever connecting the proof mass to the first resonant element. The lever can be used to amplify the strain modulation experienced by the first resonant element as a result of movement of the proof mass.

One or more additional resonant elements having a proximal end fixed to the frame adjacent to the first and second resonant elements may be included in the inertial sensor, but with only the first resonant element connected to the proof mass. All of the resonant elements are coupled to one another to form an array or chain of coupled elements. All of the resonant elements are preferably substantially identical. The more resonant elements are included in the array the greater the mode localisation resulting from a small perturbation in stiffness in the first resonant element and so the greater the amplitude ratio and resolution of the sensor. However, the more resonant elements there are, the greater the noise in the system and so a balance must be struck. It is anticipated that for most purposes, two resonant elements will be sufficient. If more than two resonant elements are included, the amplitude of vibration of each element is measured and compared to the amplitude of vibration of the first resonant element at one of the resonant frequencies.

Preferably, the proof mass is suspended from the frame by at ea one flexure.

The inertial sensor so far described provides for measurement of acceleration or strain along one axis. However, the same principles can be applied to provide a two or three dimensional inertial sensor, either by providing three orthogonal but entirely separate sensors in a single package or by providing three orthogonal sensors that all share the same proof mass.

For example, to provide sensing in a second dimension the inertial sensor may further comprise:
  a third resonant element having a proximal end and a distal end, the third resonant element being fixed to the frame at its proximal end and coupled to the proof mass at its distal end;
  a fourth resonant element having a proximal end and a distal end, the fourth resonant element being fixed to the frame at its proximal end, adjacent to the third resonant element; and
  a second means for coupling the third resonant element to the fourth resonant element between the proximal and distal ends of the third and fourth resonant elements;
  wherein the third resonant element extends from the proof mass in the same direction or a direction orthogonal to the direction at which the first resonant element extends from the proof mass.

A further pair or array of coupled resonant elements may be provided in a third orthogonal direction, with one of the resonant elements coupled to the proof mass, in order to provide a three dimensional inertial sensor.

An inertial sensor in accordance with the invention may also be used as a gyroscope. In a gyroscope in accordance with the invention, the proof mass may be coupled to the first resonant element by an intermediate frame, the intermediate frame being coupled to the first resonant element by flexures that transmit movement resulting from the Coriolis force on the proof mass orthogonal to a drive direction, but not movement in the drive direction. The Coriolis force on the proof mass may be calculated from the ratio of amplitudes of oscillation of the resonant elements, and from the Coriolis force, the angular velocity of the sensor can be calculated.

In a second aspect, the invention is a method of inertial sensing using a sensor according to the first aspect, comprising the steps of:
  oscillating the first and second resonant elements with a drive signal of the same frequency and amplitude;
  detecting an amplitude of oscillation of the first resonant element at resonance and an amplitude of oscillation of the second resonant element at resonance;
  determining an amplitude ratio of the amplitude of oscillation of the first resonant element and the amplitude of oscillation of the second resonant element; and
  determining the inertial force exerted on the first resonant element by the proof mass based on the amplitude ratio.

Preferably, the means for coupling the first resonant element to the second resonant element is an electrostatic coupling, and the method further comprises the step of applying a different DC voltage to the first resonant element than to the second resonant element to provide the electrostatic coupling.

The invention uses the phenomena of mode localization and vibration energy confinement to provide a measure of inertial force. The inertial force exerted by the proof mass puts a strain on the first resonant element, which changes its effective stiffness. Unlike the conventional approach of measuring induced frequency shifts, mode-localized sensors in accordance with the invention rely on tracking shifts in relative amplitudes of vibration between two or more vibrating elements. This enhances the parametric sensitivity and in effect, the resolution of such MEMS inertial sensors.

BRIEF DESCRIPTION OF THE DRAWINGS

Embodiments of the present invention will now be described in detail, by way of example only, with reference to the accompanying drawings, in which:

FIG. 1b is a detail view of the resonant elements of FIG. 1a;

FIG. 2 is a schematic perspective view of the sensor of FIG. 1a;

DETAILED DESCRIPTION

Figure 1A:
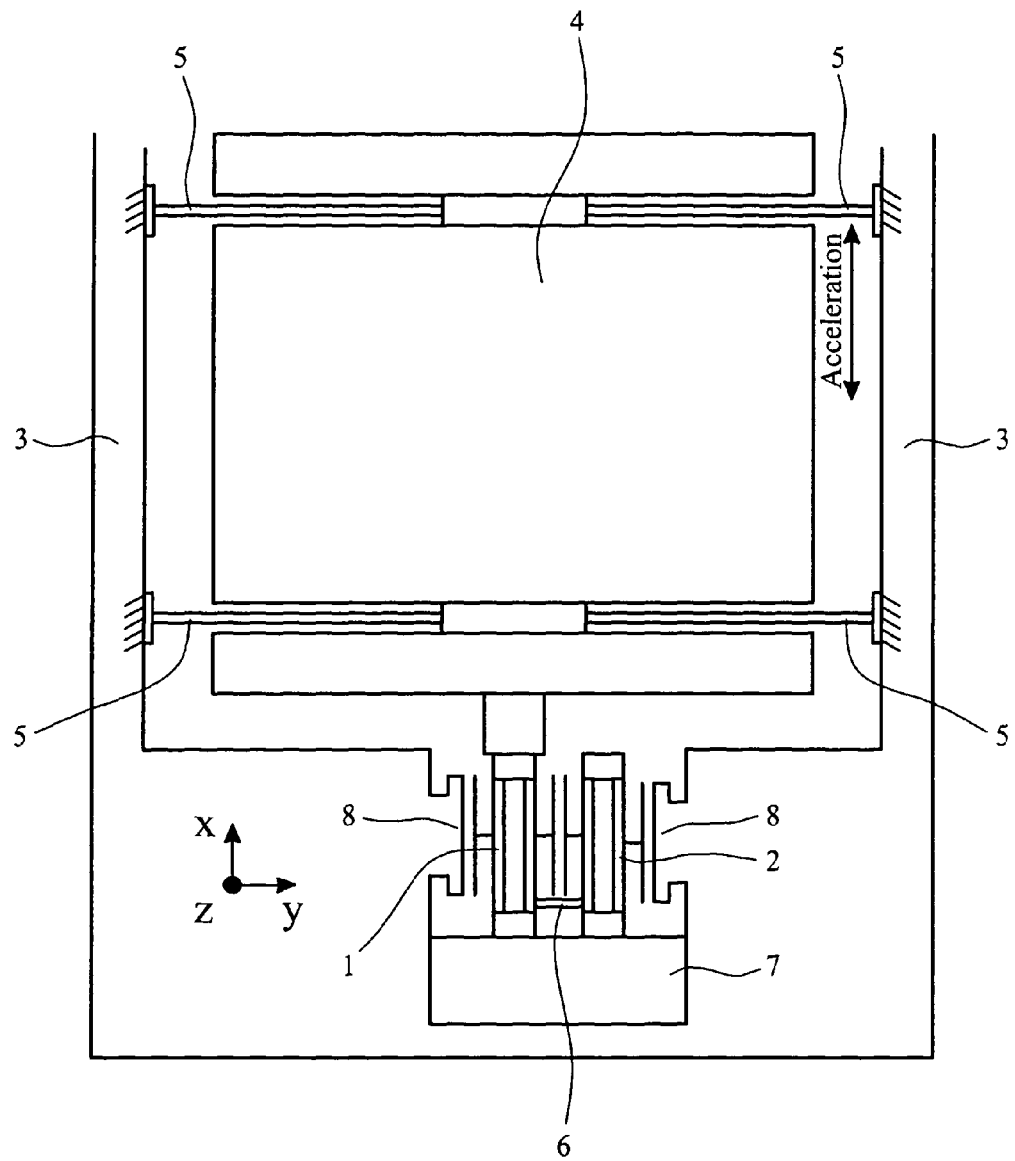
FIG. 1a is a schematic diagram of a sensor in accordance with the present invention.

FIG. 1a illustrates a sensor in accordance with the present invention. The sensor comprises two resonant elements 1, 2, which in this example are double ended tuning forks (DETFs). The two resonant elements 1, 2 are adjacent to one another and fixed to a substrate or frame 3. The first resonant element 1 is fixed to a proof mass 4, which is suspended from the frame by flexures 5. The two resonant elements are weakly coupled by a mechanical coupling element 6.

Mode localization in a device of this type may be illustrated by considering the simple case of two weakly coupled resonant elements with masses $m_1$ and $m_2$ and stiffnesses $k_1$ and $k_2$. One of the resonant elements is connected to a proof mass. When the two resonant elements are perfectly identical ($m_1=m_2=m$; $k_1=k_2=k$) the system is symmetric about the coupling, which has a stiffness $k_c$. The relative shift in the eigenstates due to a strain modulated change in stiffness on the resonant element connected to the proof mass of ($\Delta k$) is given by:

$$\frac{\Delta u}{u^0} \cong \frac{\Delta k}{4k_c}. \qquad (1)$$

A detailed explanation of mode localization in this type of system can be found in "Enhancing Parametric Sensitivity in Electrically Coupled MEMS Resonators" by Pradyumna Thiruvenkatanathan et al. Journal of Microelectromechanical Systems, Vol. 18, No. 5, October 2009. Comparing equation (1) with the conventional approach of measuring relative shift in the resonant frequency (equation (2) below), it can be observed that for any value of $k_c<(k/2)$, the relative shift in the eigenstate is greater than that of the resonant frequency:

$$\frac{\Delta f}{f^0} \cong \frac{\Delta k}{2k} \qquad (2)$$

This critical dependence of parametric sensitivity on the strength of internal coupling ($k_c$) can be exploited to enhance the performance and in effect, the resolution of such sensors. Furthermore, since the eigenstates are deduced from the amplitudes of vibration of both the coupled resonators at the eigenvalues, any effects on the stiffness due to ambient environmental fluctuations (e.g. temperature) affect both the identical resonators to the same extent, thereby leading to a common mode cancellation of these effects to the first order. However, any changes in the stiffness on one of the resonators relative to the other (differential mode), leads to significant shifts in the eigenstates under conditions of weak internal coupling as expressed in equation (1). Such a common mode rejection capability enables the realization of inertial sensors that are orders of magnitude more sensitive to the measurand alone without employing any active/passive control or compensation techniques, making this form of sensing particularly attractive over the more conventional resonant frequency based sensing approach.

Figure 1B:
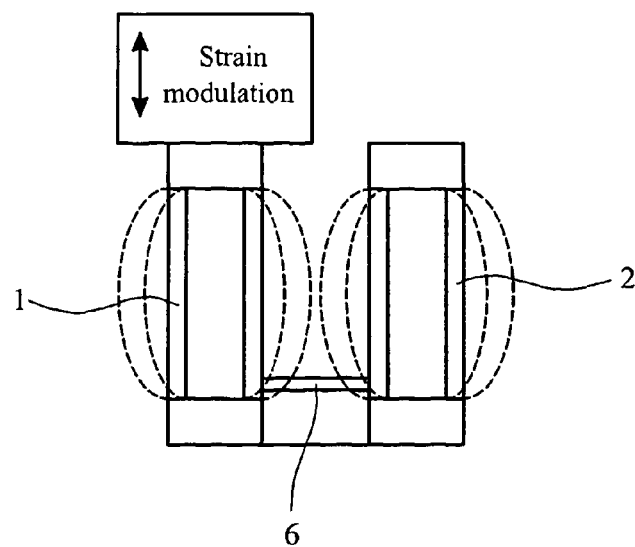

The features and operation of the sensor in FIG. 1a will now be described in more detail. The resonant elements 1, 2 are shown in more detail in FIG. 1b and are silicon DETF elements, each comprising two tines. The resonant elements are identical to within manufacturing tolerances. The coupling element 6 is also formed of silicon. The dotted lines in FIG. 1b illustrate the mode of vibration of the tines of each element.

The resonant elements can be made to resonate using several different alternative techniques. In a preferred embodiment the resonant elements are made to resonate using an electrostatic technique, by the application of an alternating voltage to a drive electrode 7 on the frame 3, at the base of the resonant elements, and the provision of another drive electrode adjacent the resonant elements, as is explained in detail with reference to FIG. 6.

The mechanical coupling is located towards the base of the resonant elements, i.e. close to the frame 3. The reason for this is that the potential energy contribution is largest near the base of the resonant elements, so that the mechanical coupling in that position mimics the behaviour of a spring without adding any additional mass to the system. So the mechanical coupling under such conditions can be modelled as a spring alone.

Strain modulation on the first resonant element 1 applied by the accelerating proof mass 4 in the drive direction modifies the effective stiffness of the first resonant element 1. This leads to a localisation of the vibration mode in one or other of the resonating elements 1, 2, as explained above. The amplitude of vibration of each of the resonating elements is measured and the amplitude ratio calculated to provide an output indicative of the acceleration on the proof mass. In order to measure the amplitude of vibration several different techniques may be used such as optical or electromagnetic measurement. However, in this embodiment sense electrodes 8 are provided for capacitive sensing, as explained in detail with reference to FIGS. 6 and 7.

The sensor of FIG. 1a is advantageously fabricated entirely from a single semiconductor wafer, such as a silicon-on-insulator (SOI) wafer and can be fabricated using convention MEMS fabrication techniques, such as etching. This includes the frame 3, the resonant elements 1, 2, the proof mass 4, the flexures 5 etc.

Figure 2:
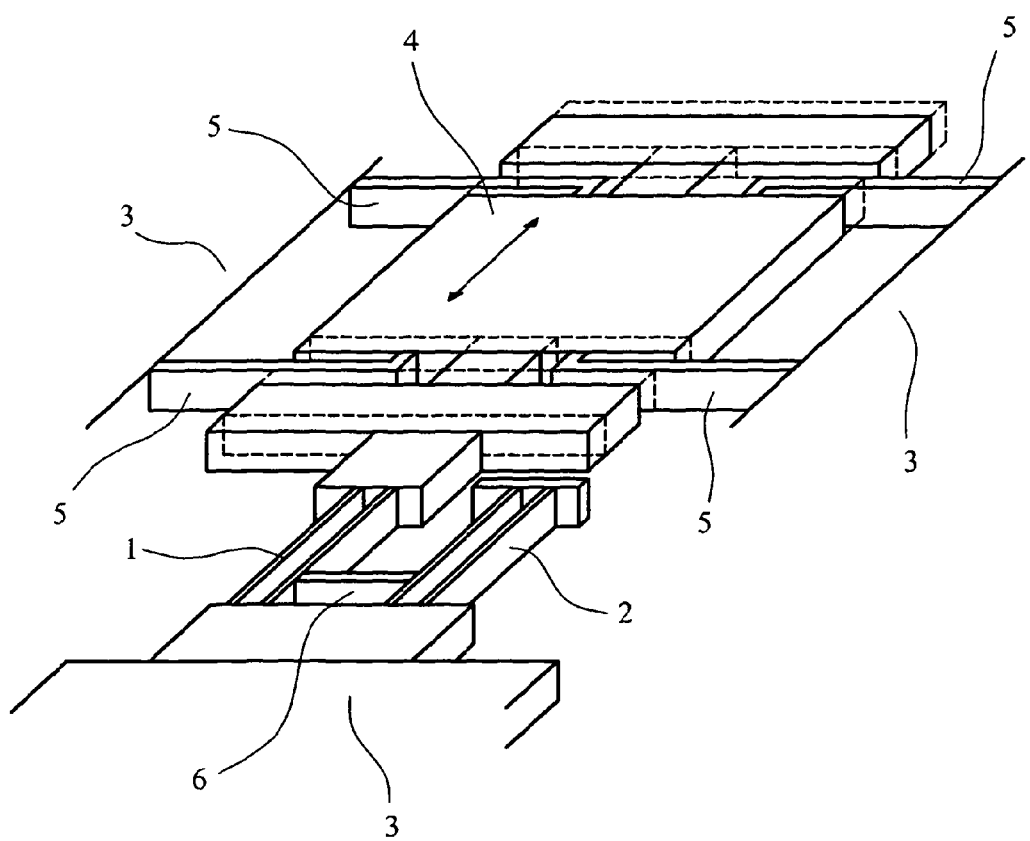

FIG. 2 is a perspective view of the sensor of FIG. 1a, not including the drive and sensor electrodes 7, 8. The dotted line shows a position of the proof mass 4 when subjected to an inertial force in the sense direction i.e. the x axis. Each of the tines in the resonant elements 1, 2 is 25 μm thick, 300 μm long and 6 μm wide, with a gap of 6 μm between the tines.

Figure 3:
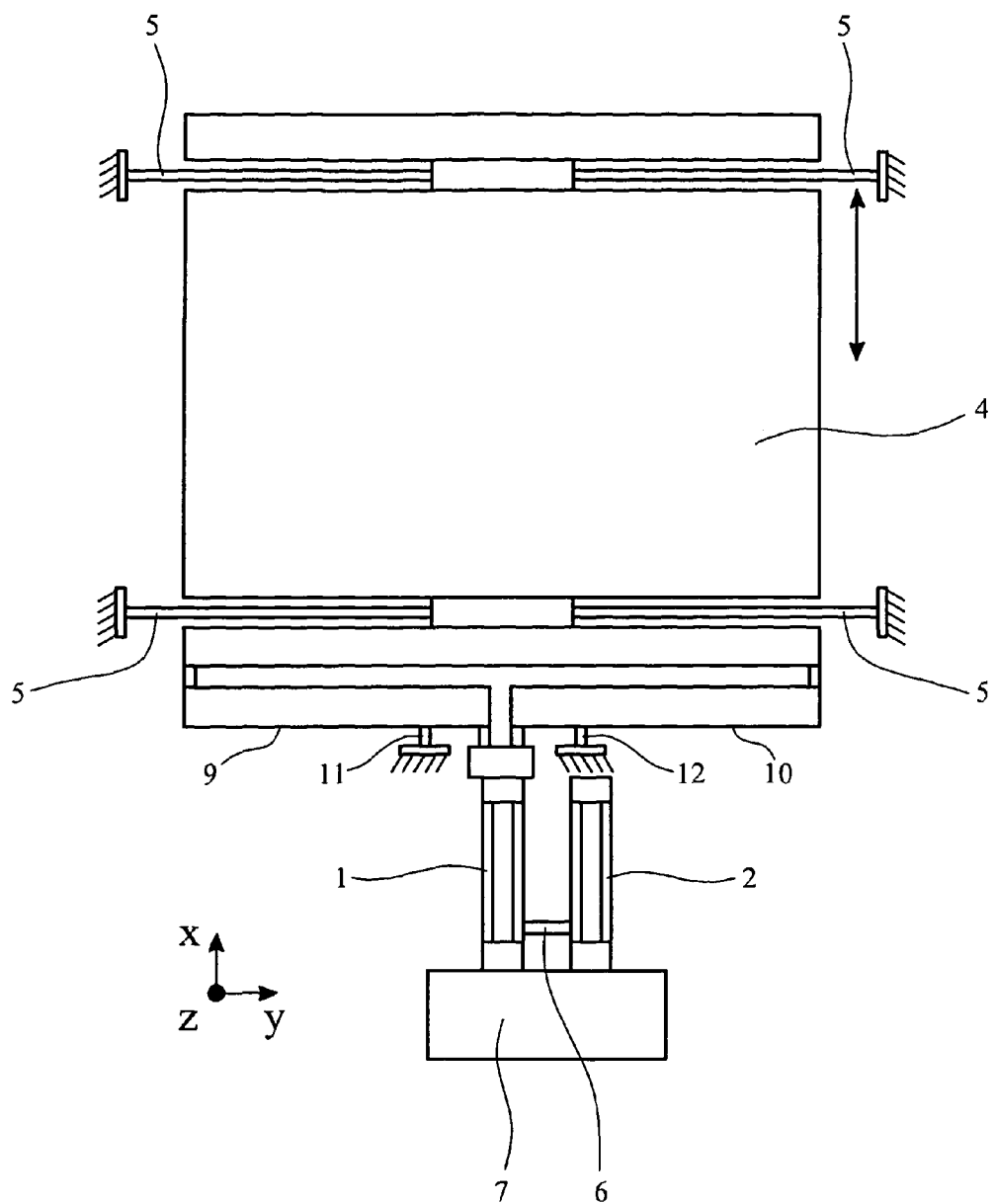
FIG. 3 is a schematic view of a sensor in accordance with the present invention, including micro-levers for inertial force amplification.

FIG. 3 shows a modification to the device shown in FIG. 1a, (the frame and sensor electrodes are not shown). The sensor of FIG. 3 includes micro-levers 9, 10 between the proof mass and the first resonant element 1. The micro-levers 9, 10 pivot about fulcrums 11 and 12 respectively. The fulcrums 11 and 12 are positioned closer to the resonant element 1 than to the connection between the micro-levers 9, 10 and the proof mass 4, thereby amplifying the strain on the resonant element 1. Micro-levers of this type are described in greater detail in U.S. Pat. No. 5,969,249.

Figure 4:
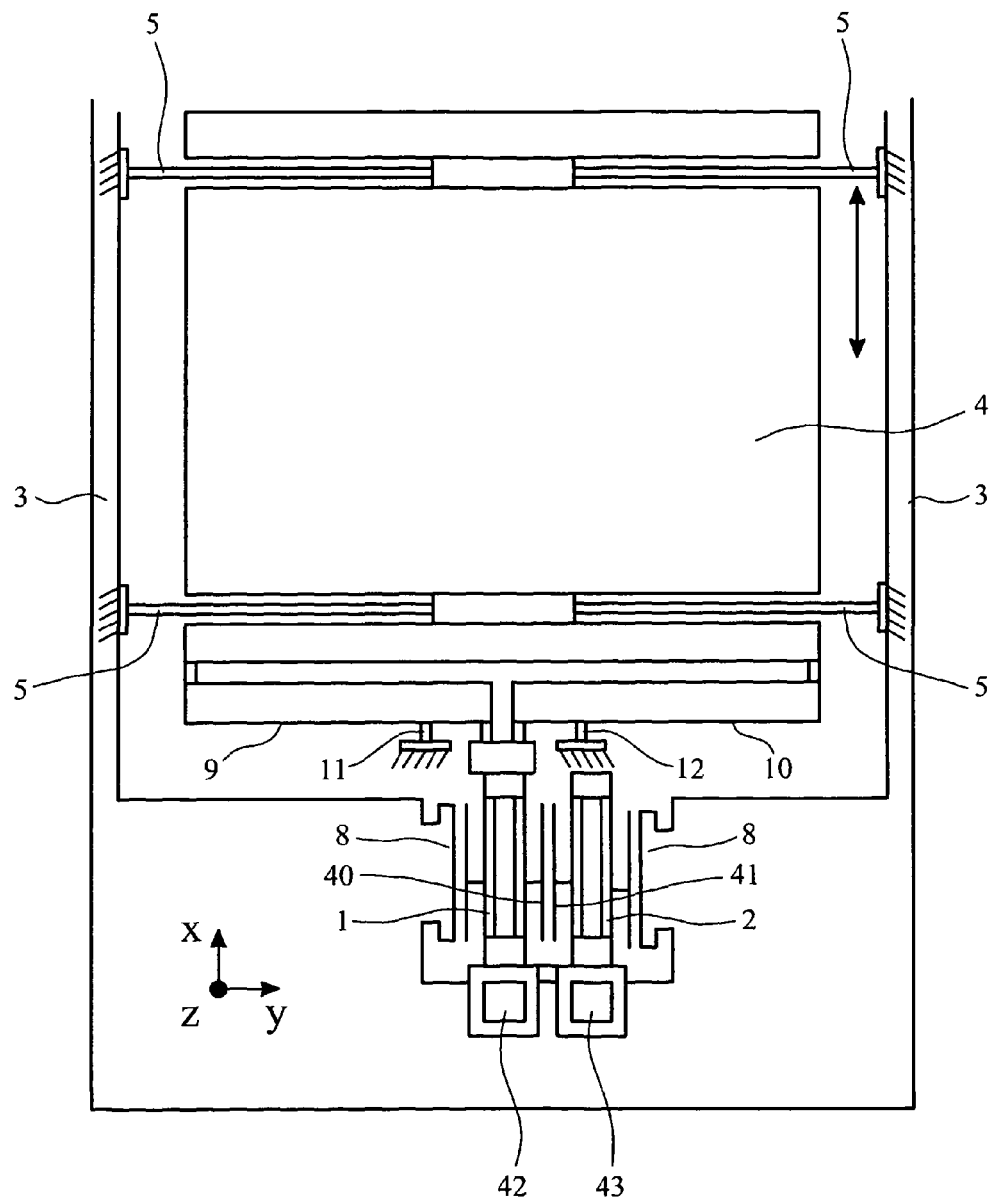
FIG. 4 shows another example of a sensor in accordance with the invention, using electrostatic coupling between the resonant elements.
Figure 5:
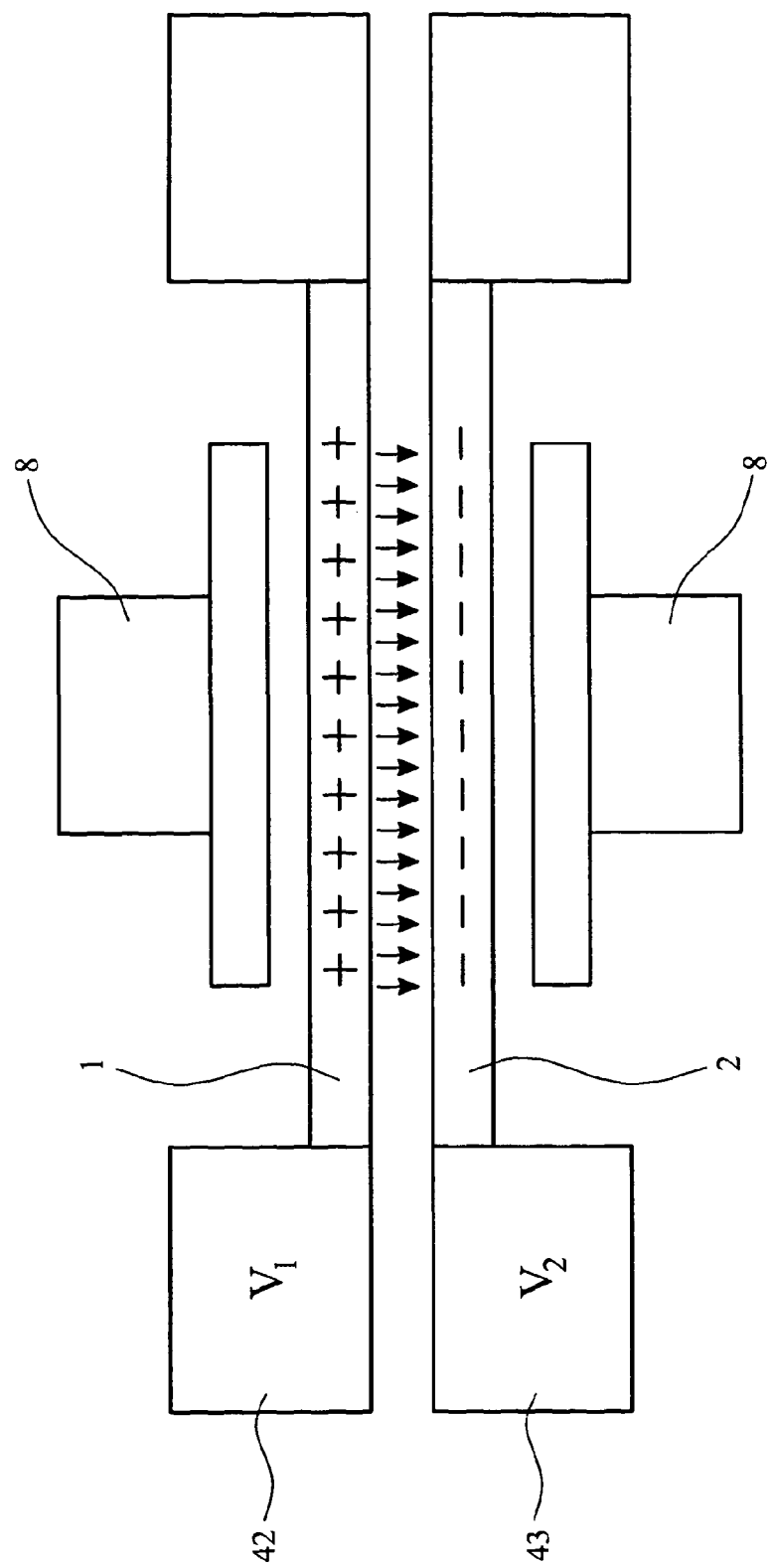
FIG. 5 is a schematic illustration of the principle of electrostatic coupling between the resonant elements.

FIG. 4 shows the sensor arrangement of FIG. 3 but with an electrostatic coupling between the resonant elements instead of a mechanical coupling. An electrostatic coupling is provided by including coupling electrodes 40, 41 on each of the resonant elements, directly opposing each other and leaving a small (approximately 2 μm) coupling gap. Different DC voltages are applied to each coupling electrode using separate, electrically isolated drive electrodes 42, 43 to create an attractive force between the two resonant elements as shown in FIG. 5. FIG. 5 schematically illustrates the two resonant elements held at different DC voltages $V_1$ and $V_2$. The electrostatic attraction of resonant element 1 to resonant element 2 results in mechanical spring like behaviour. It results, in effect, in a negative electrostatic spring between the two resonant elements.

The use of electrostatic coupling has two significant advantages. Firstly, it provides for a tuneable coupling and a significantly weaker coupling than is possible with a mechanical coupling. The weaker the coupling the more pronounced the localisation effect and so the higher resolution the sensor can be made. Secondly, the different DC voltages can be used to compensate for any mechanical asymmetry. Applying different DC voltages to the resonant elements shifts their individual effective stiffness. This would disrupt the initial mechanical symmetry of the sensor. A way to avoid this is to apply DC voltages of equal absolute value but opposite polarity to the two resonant elements. Small differences in the absolute values of their DC voltages can be used to then compensate for any mechanical asymmetry.

Figure 6:
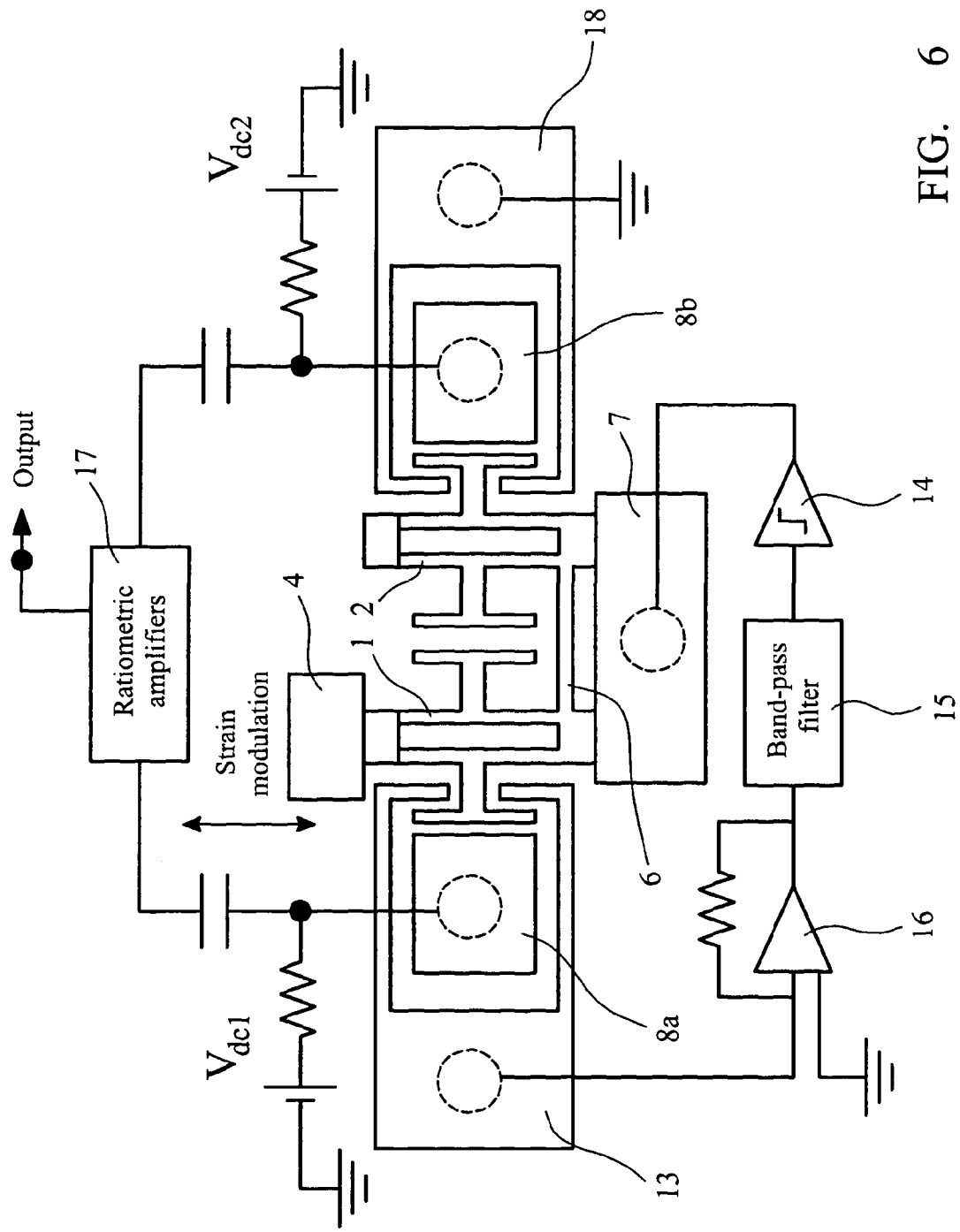
FIG. 6 is a schematic diagram of the drive and processing elements of a sensor in accordance with the present invention.

FIG. 6 illustrates the drive and processing electronics of a sensor in accordance with the present invention. FIG. 6 illustrates both a mechanical coupling 6 and the plates that can be used for electrostatic coupling between the two resonant elements. However, the circuit configuration shown in FIG. 6 is for a mechanical coupling, as there is only a single drive electrode 7.

The first and second resonant elements 1 and 2 are driven by an AC voltage signal from the drive electrode 7. DC bias voltages $V_{dc1}$ and $V_{dc2}$ are applied to sense electrodes 8a and 8b so that the resonant elements are alternately attracted to and repelled from the sense electrodes. $V_{dc1}$ and $V_{dc2}$ are of equal magnitude, but may be of the same or opposite polarity depending on the mode of vibration desired. Sustained oscillations are maintained in a similar manner to that of a conventional oscillator by sensing off electrode 13. However, unlike the conventional oscillator design the output of the automatic gain control (AGC) 14 is fed into drive electrode 7 that drives both of the coupled resonators into a single resonant mode (that may be either the first or the second fundamental mode—the frequency range of which may be limited by the bandpass filter 15). The oscillator circuit also includes a trans-resistance amplifier 16. The modal amplitudes of the two resonators (at the resonant mode wherein the oscillations are sustained) are then read out from two separate sense electrodes 8a, 8b. Sensing of the amplitude of vibration is achieved by detecting a change in capacitance resulting from movement of the resonant elements towards and away from the electrodes 8a and 8b. The outputs from the sense electrodes are in turn fed into a ratiometric amplifier circuit 17 that may be used to directly get an amplified measure of the relative motional current/voltage variations at the resonant mode. This output yields a direct measure of the modal amplitude variations of the two coupled resonators from which any induced changes in the inertial force/strain on the first resonant element 1 may be evaluated using equation (1) above. The ratiometric amplifier circuit 17 may consist of a voltage divider or a current divider circuit that may be used to obtain a calibrated ratio of the motional currents of the coupled resonators (which are proportional to the amplitudes of vibration) at the resonant frequency sustained by the oscillator circuit.

Electrode 18 may be used as an additional electrical tuning electrode for initial mechanical symmetry. However, in the example shown in FIG. 6 it is grounded to avoid any additional stray charge.

It is possible to reverse the configuration of FIG. 6 by applying the oscillating drive signal through electrodes 8a and 8b, applying a DC bias through electrode 7 and sensing the amplitude of vibration through electrodes 13 and 18.

Figure 7A:
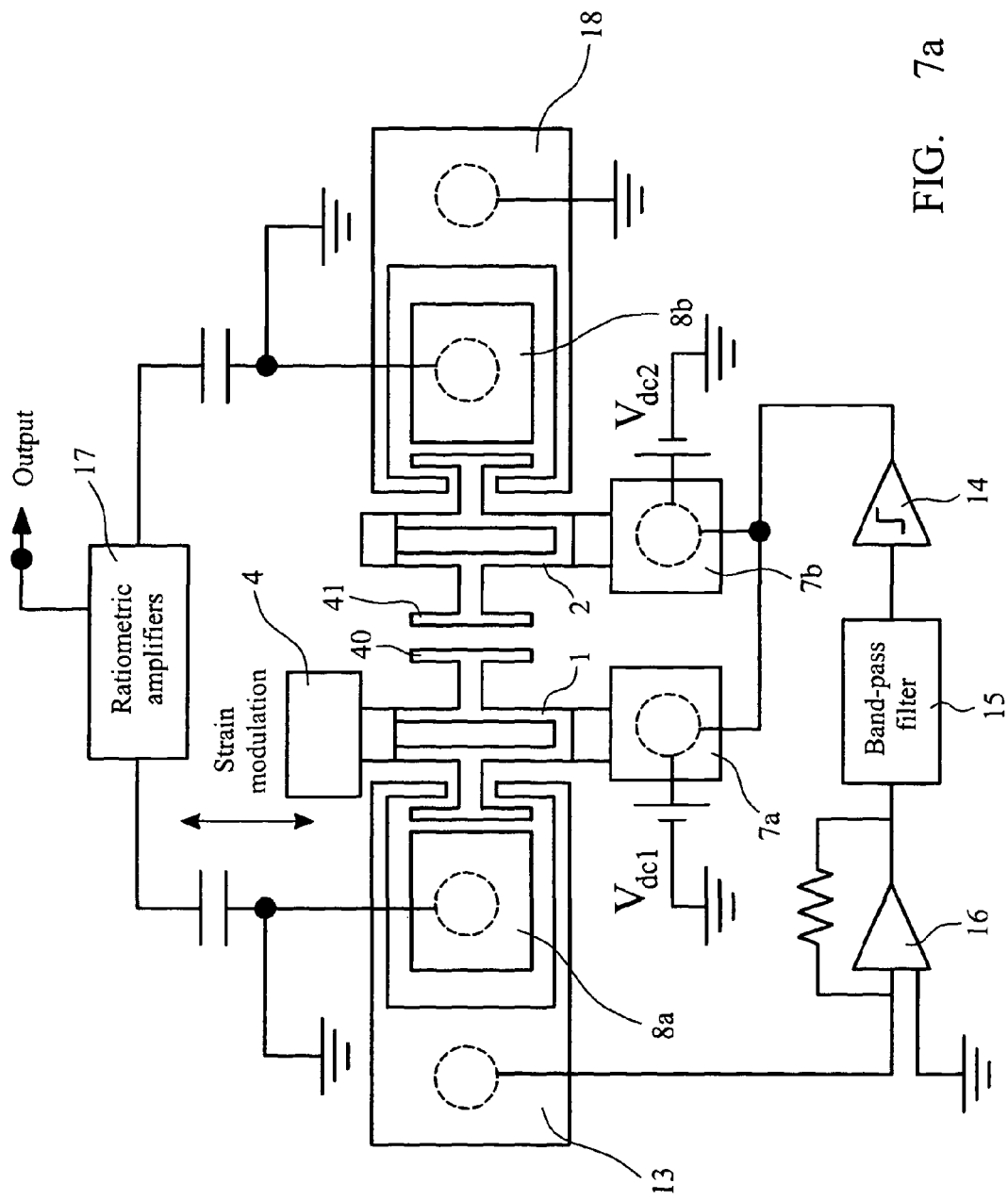
FIG. 7a is a schematic diagram of the drive and processing elements of an alternative sensor in accordance with the present invention.

FIG. 7a illustrates a circuit similar to that shown in FIG. 6 but for an electrostatic coupling between the resonant elements. The circuit of FIG. 7a is the same as the circuit of FIG. 6 except that the drive electrode 7 comprises two separate electrodes 7a and 7b, one for each resonant element and the mechanical coupling is absent. The same AC signal is applied to each drive electrode but a different DC bias voltage to each electrode to provide the electrostatic coupling. As explained, the DC bias voltages for electrostatic coupling are preferably of equal magnitude but of opposite polarity.

Figure 7B:
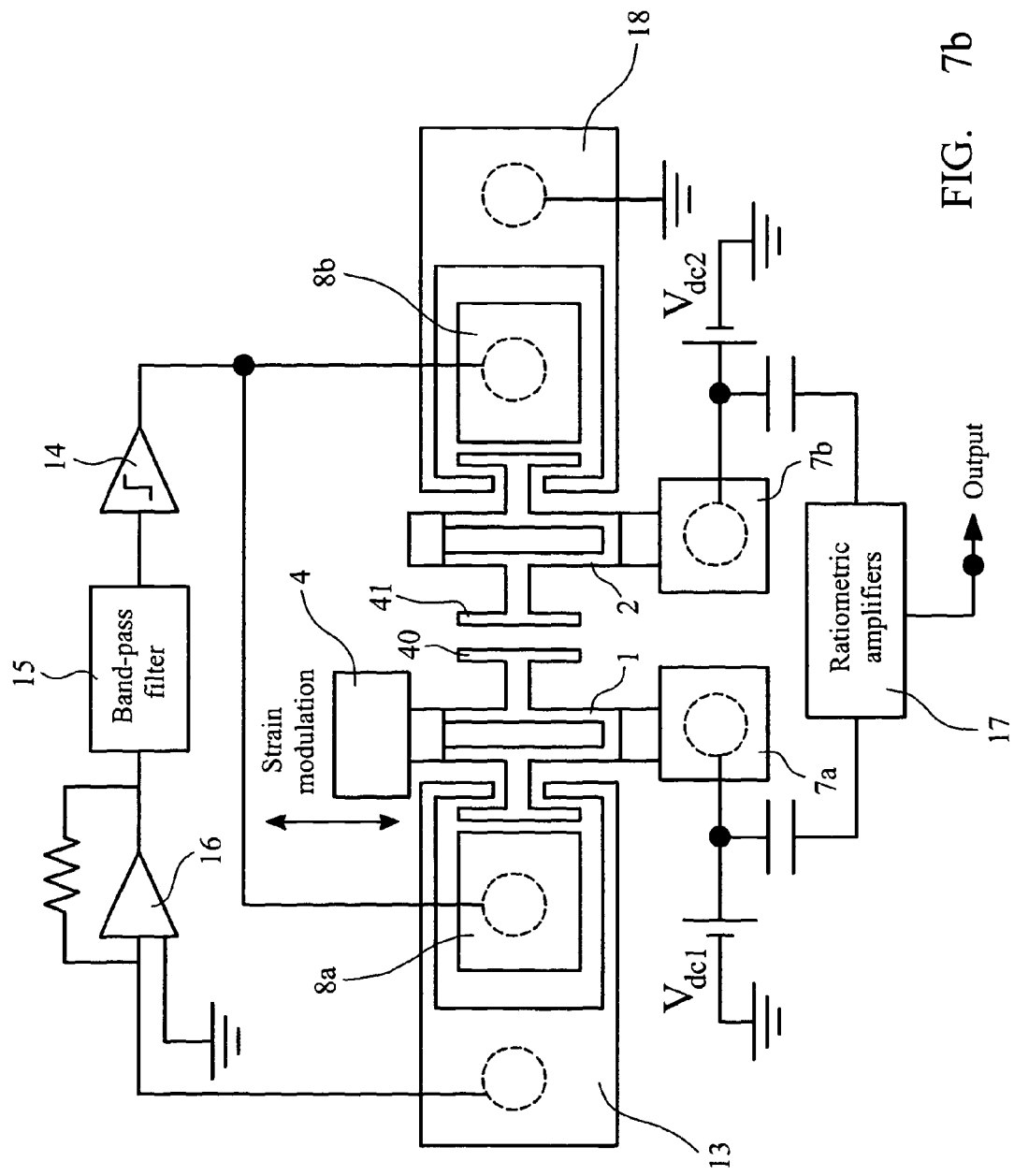
FIG. 7b is a schematic diagram of the drive and processing elements of a further alternative sensor in accordance with the present invention.

FIG. 7b illustrates an alternative configuration to FIG. 7a. In FIG. 7b, the drive signal from the oscillator circuit 14, 15, 16 is applied to the electrodes 8a and 8b, which are adjacent to the first and second resonant elements 1 and 2. The amplitude of vibration of the resonant elements 1, 2 is sensed through electrodes 7a and 7b respectively. DC bias voltages $V_{dc1}$ and $V_{dc2}$ are applied to electrodes 7a and 7b respectively. Ratiometric amplifier 17 is connected to electrodes 7a and 7b to provide an output indicative of the ratio of the amplitudes of vibration of the first and second resonant elements.

Figure 8:
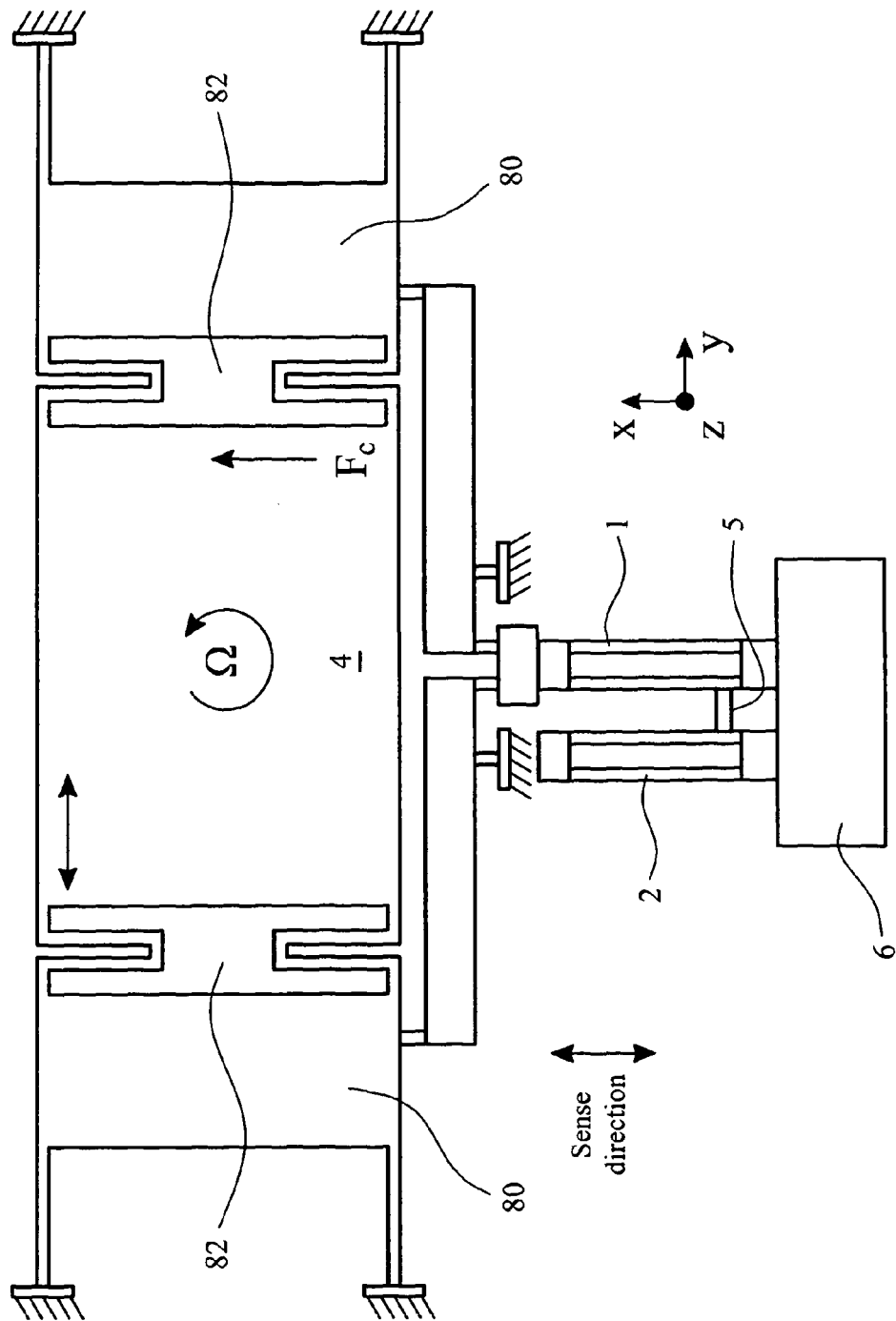
FIG. 8 is a schematic illustration of a gyroscope in accordance with the present invention.

The inertial sensors described with reference to FIGS. 1 to 7 are accelerometers. FIG. 8 is a schematic illustration of a gyroscope in accordance with the present invention, operating on the same principle. The sensor includes two masses:—a vibrating proof mass 4 that is allowed to displace in a direction orthogonal to the drive axis; and a suspended frame 80 that is connected to the proof mass by drive flexures 82 in a manner that does not transmit motion in the drive direction (shown as the y axis) but allows the motion due to the 'Coriolis force' to couple along the sense axis (shown as the x axis). One of two weakly coupled resonators is connected to the suspended frame via micro-levers as described with reference to FIG. 3. Any motion of the frame due to an induced Coriolis force results in a strain on the resonant element that is coupled to the frame, while the other resonant element undergoes no strain modulation. This, in turn, localizes the coupled vibration modes of the resonant elements as previously described. The resulting large variations in the relative modal amplitudes may be measured to get a direct estimate of the inertial Coriolis force and, in consequence, the applied rotation, in the same manner as described above.

Figure 9:
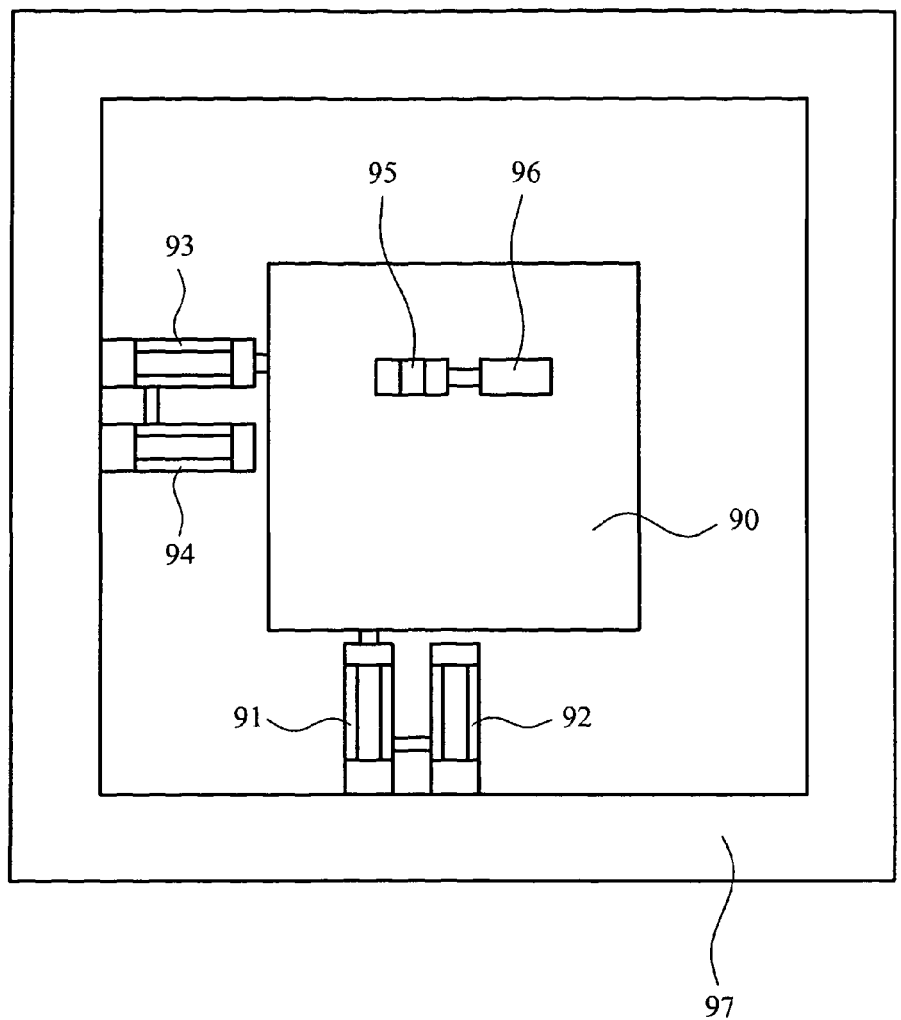
FIG. 9 is a schematic illustration of an accelerometer with three orthogonal axes of sensitivity in accordance with the present invention.

FIG. 9 is a schematic, cut away, plan view of an inertial sensor providing sensing in three dimensions. A proof mass 90 is coupled to three orthogonal disposed pairs of coupled resonant elements 91, 92, 93, 94, 95, 96 which are each coupled to frame 97. Only one resonant element in each pair 91, 93, 95 is coupled to the proof mass 90. The drive and sensing electrodes are not shown but are the same as illustrated in FIG. 6 for each pair of resonant elements.

Figure 10:
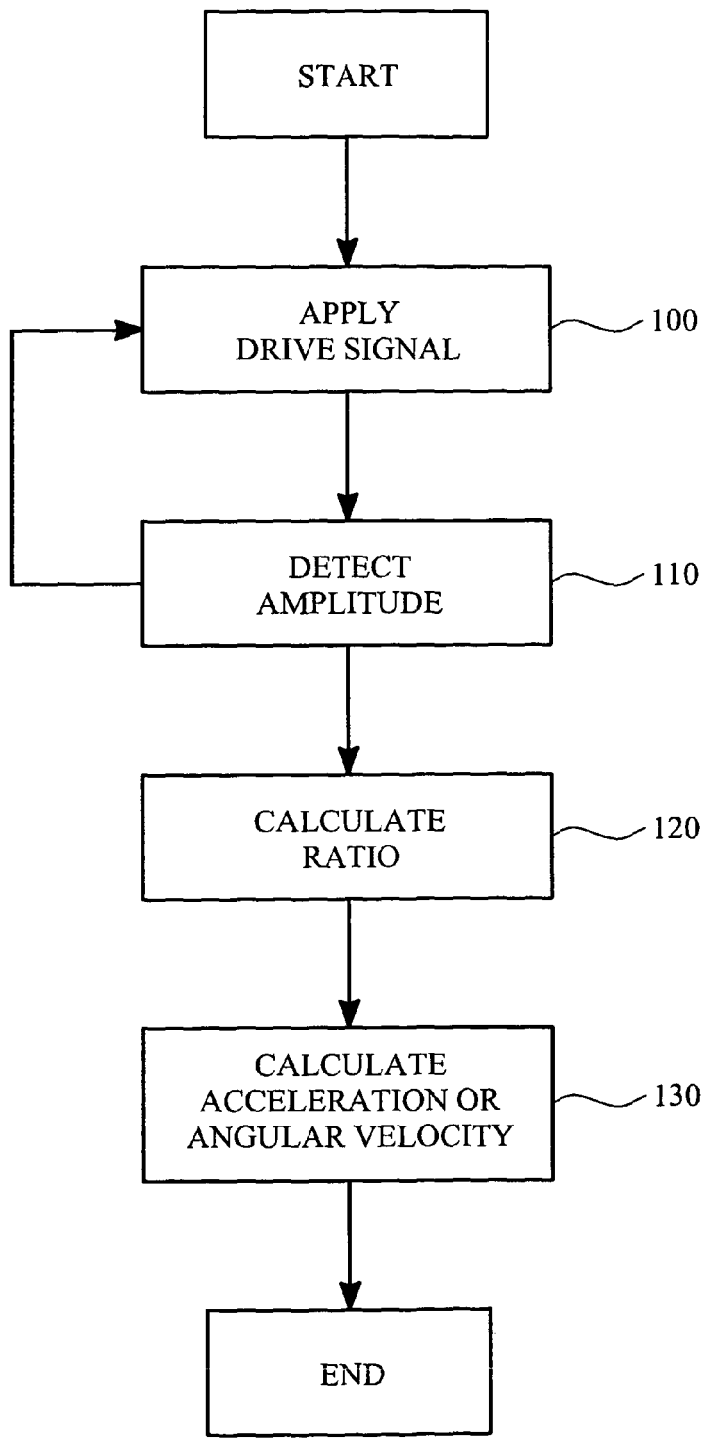
FIG. 10 is a flow diagram illustrating a method of sensing inertial force in accordance with the present invention.

FIG. 10 is a flow diagram, illustrating the steps carried out in a method in accordance with the present invention using an inertial sensor of the type described above with reference to FIGS. 1 to 9. In a first step, step 100, the resonant elements are caused to vibrate in a resonant mode using a drive signal. As described above the drive signal may comprise an AC voltage applied to the resonant elements and a DC biasing voltage applied to adjacent electrodes. In step 110, the amplitude of vibration of each of the resonant elements is detected. The amplitude of vibration may be used to feedback to the drive signal generator to maintain the resonant elements in resonance. The amplitude of vibration of each of the resonant elements is compared in step 120 to provide an amplitude ratio. This amplitude ratio is used in step 130 to calculate the change in effective stiffness of the first resonant element from which the applied strain on the first resonant element can be determined and hence the acceleration of the proof mass along the axis of sensitivity can be determined.

It is possible to use more than two coupled resonant elements. For example three or four coupled resonant elements may be used in a chain, with only one resonant element coupled to the proof mass. A larger number of resonant elements increases the degree of localisation of the mode energy and so, in theory, may be used to enhance sensitivity of the sensor. However, each additional resonant element introduces additional complexity in the interface and signal processing electronics, as well as imposing stricter demands on the fabrication tolerances.

The invention claimed is:

1. An inertial sensor comprising:
a frame;
a proof mass;
a first resonant element having a proximal end and a distal end, the first resonant element being fixed to the frame at its proximal end and coupled to the proof mass at said its distal end;
a second resonant element having a proximal end and a distal end, the second resonant element being fixed to the frame at said proximal end of said second resonant element, adjacent to the first resonant element, such that there is no coupling between the second resonant element and the proof mass;
a means for coupling the first resonant element to the second resonant element;
a drive means coupled to the first and second resonant elements for vibrating the first and second resonant elements; and
a sensor assembly for detecting an amplitude of vibration of the resonant elements.

2. An inertial sensor according to claim 1, wherein the means for coupling the first resonant element to the second resonant element is an electrostatic coupling element.

3. An inertial sensor according to claim 2, wherein the electrostatic coupling element is a pair of plates, one plate in the pair of plates coupled to or forming part of the first resonant element and the other plate in the pair of plates coupled to or forming part of the second resonant element, and a voltage source connected to the pair of plates for applying a voltage difference between the plates.

4. An inertial sensor according to claim 1, wherein the means for coupling is a mechanical linkage between the first resonant element and the second resonant element coupled to the first resonant element at a position between the proximal and distal ends of the first resonant element and coupled to the second resonant element at a position between the proximal and distal ends of said second resonating element.

5. An inertial sensor according to claim 4, wherein the mechanical linkage is positioned closer to the proximal ends of the first and second resonant elements than to the distal ends of said first and second resonant elements.

6. An inertial sensor according to claim 4, wherein the mechanical linkage is integrally formed with the first and second resonant elements.

7. An inertial sensor according to claim 1, wherein the means for coupling has an effective stiffness of less than half of a stiffness of both the first and second resonant elements.

8. An inertial sensor according to claim 1, wherein the first and second resonant elements are of substantially the same dimensions and material properties.

9. An inertial sensor according to claim 1, wherein the sensor assembly comprises capacitive sensors positioned adjacent the first and second resonant elements.

10. An inertial sensor according to claim 1, further comprising processing electronics for determining a ratio of the amplitude of vibration of the first resonant element and the amplitude of vibration of the second resonant element.

11. An inertial sensor according to claim 1, wherein the drive means comprises a first drive electrode coupled to the first resonant element for exciting the first resonant element, and a second drive electrode coupled to the second resonant element for exciting the second resonant element.

12. An inertial sensor according to claim 11, wherein the means for coupling comprises the first and second drive electrodes.

13. An inertial sensor according to claim 1, wherein the drive means includes a feedback loop to maintain the resonant elements in resonance.

14. An inertial sensor according to claim 1, further comprising at least one lever connecting the proof mass to the first resonant element.

15. An inertial sensor according to claim 1, further comprising at least one additional resonant element having a proximal end fixed to the frame, and an additional coupling means coupling the additional resonant element to the first resonant element or the second resonant element.

16. An inertial sensor according to claim 1, further comprising a third resonant element having a proximal end and a distal end, the third resonant element being fixed to the frame at the proximal end of said third resonant element and coupled to the proof mass at the distal end of said third resonant element;
a fourth resonant element having a proximal end and a distal end, the fourth resonant element being fixed to the frame at the proximal end of said fourth resonant element, adjacent to the third resonant element; and a second means for coupling the third resonant element to the fourth resonant element between the proximal and distal ends of the third and fourth resonant elements;

wherein the third resonant element extends from the proof mass in the same direction or an orthogonal direction orthogonal to the direction at which the first resonant element extends from the proof mass.

17. An inertial sensor according to claim 1, wherein the inertial sensor is configured as an accelerometer.

18. An inertial sensor according to claim 1, wherein the inertial sensor is configured as a gyroscope.

19. A method of inertial sensing using the sensor as claimed in claim 1, comprising the steps of:
   oscillating the first and second resonant elements with a drive signal of the same frequency and amplitude;
   detecting an amplitude of oscillation of the first resonant element and an amplitude of oscillation of the second resonant element;
   determining an amplitude ratio of the amplitude of oscillation of the first resonant element at resonance and the amplitude of oscillation of the second resonant element at resonance; and
   determining an inertial force exerted on the first resonant element by the proof mass from the amplitude ratio.

20. A method according to claim 19, wherein the means for coupling the first resonant element to the second resonant element is an electrostatic coupling, further comprising the step of applying a different DC voltage to the first resonant element than to the second resonant element to provide the electrostatic coupling.

* * * * *